(12) United States Patent
Perra

(10) Patent No.: US 11,761,215 B2
(45) Date of Patent: Sep. 19, 2023

(54) FLOOR PANEL AND FLOOR COVERING

(71) Applicant: 14F Licensing NV, Hamont-Achel (BE)

(72) Inventor: Antonio Giuseppe Perra, Bergen (NL)

(73) Assignee: 14F Licensing NV, Hamont-Achel (BE)

( * ) Notice: Subject to any disclaimer, the term of this patent is extended or adjusted under 35 U.S.C. 154(b) by 120 days.

(21) Appl. No.: 17/426,982

(22) PCT Filed: Jan. 30, 2019

(86) PCT No.: PCT/NL2019/050054
§ 371 (c)(1),
(2) Date: Jul. 29, 2021

(87) PCT Pub. No.: WO2020/159352
PCT Pub. Date: Aug. 6, 2020

(65) Prior Publication Data
US 2022/0112727 A1    Apr. 14, 2022

(51) Int. Cl.
*E04F 15/00* (2006.01)
*E04F 15/02* (2006.01)
*E04F 15/04* (2006.01)
*E04F 15/10* (2006.01)

(52) U.S. Cl.
CPC ...... *E04F 15/02038* (2013.01); *E04F 15/046* (2013.01); *E04F 15/102* (2013.01); *E04F 15/107* (2013.01); *E04F 2201/0123* (2013.01); *E04F 2201/0138* (2013.01); *E04F 2201/023* (2013.01); *E04F 2203/065* (2013.01)

(58) Field of Classification Search
CPC .......... E04F 15/02033; E04F 15/02038; E04F 15/107; E04F 15/102; E04F 2201/042; E04F 2201/0107; E04F 2201/03; E04F 2201/0552; E04F 2201/023; E04F 2201/0535; E04F 2201/0146; E04F 2201/043; E04F 2201/0547; E04F 2201/0153; E04F 2201/0138; E04F 15/02005; E04F 2201/0115; E04F 2201/0161; E04F 15/046; E04F 2201/0123; E04F 2203/065
See application file for complete search history.

(56) References Cited

U.S. PATENT DOCUMENTS

| | | |
|---|---|---|
| 3,694,983 A | 10/1972 | Couquet |
| 8,307,600 B2 * | 11/2012 | Heartsfield ............... A63B 6/00 52/177 |
| 8,394,217 B2 * | 3/2013 | Pien .................. E04F 15/02172 156/182 |
| 8,745,949 B1 * | 6/2014 | Pien .................. E04F 15/02038 52/510 |
| 8,745,952 B2 | 6/2014 | Perra et al. |
| 9,181,717 B1 | 11/2015 | Jamison |

(Continued)

FOREIGN PATENT DOCUMENTS

| EP | 1816283 A2 | 8/2007 |
|---|---|---|
| EP | 2440724 A2 | 4/2012 |

*Primary Examiner* — Chi Q Nguyen
(74) *Attorney, Agent, or Firm* — THE WEBB LAW FIRM

(57) ABSTRACT

A floor panel and a floor covering including a plurality of such floor panels, and more particularly, a laminated floor panel. The floor panel includes a hook that protrudes from an upward tongue of one floor panel to engage a clearance between an upward tongue block and an upward tongue of an adjacent floor panel.

20 Claims, 5 Drawing Sheets

(56) References Cited

U.S. PATENT DOCUMENTS

| | | | |
|---|---|---|---|
| 11,274,433 B2* | 3/2022 | Britton | E04B 1/54 |
| 2005/0183370 A1* | 8/2005 | Cripps | E04F 15/105 |
| | | | 52/591.5 |
| 2010/0281810 A1* | 11/2010 | Ruland | E04F 15/02 |
| | | | 52/588.1 |
| 2010/0319282 A1 | 12/2010 | Ruland | |
| 2011/0265409 A1* | 11/2011 | Pien | E04B 5/026 |
| | | | 52/309.1 |
| 2011/0265946 A1* | 11/2011 | Pien | E04B 5/026 |
| | | | 156/268 |
| 2013/0047537 A1* | 2/2013 | Dao | E04F 15/02 |
| | | | 52/309.3 |

\* cited by examiner

FLOOR PANEL AND FLOOR COVERING

CROSS-REFERENCE TO RELATED APPLICATION

This application is the United States national phase of International Application No. PCT/NL2019/050054 filed Jan. 30, 2019, the disclosure of which is hereby incorporated by reference in its entirety.

BACKGROUND OF THE INVENTION

Field of the Invention

The present invention relates to a floor panel and to a floor covering comprising a plurality of such floor panels. The present invention particularly relates to a laminated floor panel but could be equally applied to hardwood floor panels, solid wood floor panels, or PVC based floor panels.

Description of Related Art

A laminated floor panel typically comprises, from bottom to top, a backing layer, a substrate or core layer, a pattern layer, and a wear layer. The substrate or core layer typically comprises a medium-density fiberboard (MDF) or a high-density fiberboard (HDF) layer. An underlayment can be arranged in between the floor panels and the subflooring to act as a sound barrier.

To arrange the floor panels on the subflooring for making a floor covering, the floor panels can be glued to the subflooring and/or to each other. Alternatively, the floor panels can be provided with coupling means, e.g. a tongue and groove, to couple to each other without using glue. The present invention particularly relates to this last type of flooring.

A floor panel typically has an elongated shape, for example a rectangular shape. The present invention particularly relates to floor panels having such shape. For such floor panels a distinction can be made between the so-called short sides and long sides.

A floor panel as defined by the preamble of claim 1 is known from EP 2440724. This floor panel comprises a lower part, an intermediate part, and an upper part. The lower part has a lower extension region that extends beyond the intermediate part at a first and second side of the intermediate part. The upper part has an upper extension region that extends beyond the intermediate part at a third and fourth side of the intermediate part, wherein the third and fourth sides are opposite to the first and second sides, respectively.

In this known floor panel, the lower extension region comprises a first upward tongue that runs at a distance from and parallel to the first side of the intermediate part, a second upward tongue that runs at a distance from and parallel to the second side of the intermediate part, and a lower upward tongue block, which is aligned with and separated from the first upward tongue and aligned with and separated from the second upward tongue. Similarly, the upper extension region comprises a third downward tongue that runs at a distance from and parallel to the third side of the intermediate part, and a fourth downward tongue that runs at a distance from and parallel to the fourth side of the intermediate part.

A clearance between the first upward tongue and the intermediate part defines a first upward groove for receiving the third downward tongue of an adjacent floor panel. A clearance between the second upward tongue and the intermediate part defines a second upward groove for receiving the fourth downward tongue of an adjacent floor panel. Furthermore, a clearance between the third downward tongue and the intermediate part defines a third downward groove for receiving the first upward tongue of an adjacent floor panel. In addition, a clearance between the fourth downward tongue and the intermediate part defines a fourth downward groove for receiving the second upward tongue of an adjacent floor panel.

A well known problem of floor coverings comprising laminated floor panels is related to thermal expansion or contraction, particularly when the floor panels are subjected to moisture in a non-uniform manner. For example, due to thermal expansion, the floor panels may expand along their longitudinal direction. Consequently, significant mechanical stress will build up at the sides of the floor panels where they are coupled using a tongue and groove coupling. This especially holds for the short sides. In some cases, the floor panels will disengage locally from the subflooring. In more extreme cases, the tongues and grooves of adjacent floor panels will decouple.

SUMMARY OF THE INVENTION

An object of the present invention is to provide a floor panel of the abovementioned type in which the problems associated with thermal expansion or contraction do not occur or at least to a lesser extent.

According to the invention, this object is achieved by a floor panel as described that is characterized in that the floor panel further comprises a first hook that protrudes from the second upward tongue and parallel to the second side, which first hook is configured for hooking into a clearance between the lower upward tongue block and the second upward tongue of a first further floor panel among said plurality of floor panels that is arranged adjacent to the third side of the floor panel, wherein, when the first further floor panel and the floor panel are coupled together, the second upward tongue of the floor panel, the second upward tongue of the first further floor panel, and the first hook can be received in a fourth downward groove of a second further floor panel among said plurality of floor panels for the purpose of simultaneously locking the floor panel, the first further floor panel, and the second further floor panel, the second further floor panel being arranged adjacent to the second side of the floor panel.

The first hook according to the present invention represents a coupling between the floor panel and the first further floor panel of which the hooking action can be locked by arranging the second further floor panel. More in particular, direct physical contact exists between the second further floor panel and an upward surface of the first hook or such contact will arise upon slight mutual and vertical movement of the floor panel and the second further floor panel. Therefore, by arranging the second further floor panel, the coupling between the floor panel and the first further floor panel can be strengthened. The Applicant has found that this strengthening significantly reduces the adverse effects associated with thermal expansion and/or contraction as encountered with the abovementioned known floor panels.

The first upward groove and the second upward groove may be at a substantially identical vertical level. Here, the vertical direction corresponds to the direction from the lower part to the upper part. Similarly, the third downward groove and the fourth downward groove may be at a substantially identical vertical level. For example, the lower extension region may comprise an essentially flat base portion from which the upward tongues and the lower upward tongue block extend upwardly and the upper extension region may comprise an essentially flat base portion from which the downward tongues extend downwardly.

The floor panel can be configured such that, when the floor panel is coupled to the first further floor panel, the first hook, the second upward tongue of the first further floor panel, and the second upward tongue of the floor panel essentially form a continuous upward tongue. The first hook may comprise a first horizontal part and a first vertical part protruding downwardly from the first horizontal part.

As an example of continuity of the upward tongue, a sum of a thickness of the first horizontal part, as measured along the vertical direction, and a height of the lower upward tongue block may substantially equal a height of the second upward tongue. This is contrary to the abovementioned known floor panel in which the height of the lower upward tongue block corresponds to the height of the first upward tongue and second upward tongue. Furthermore, a height of the first vertical part, as measured from a lower surface of the first horizontal part, substantially equals a height of the lower upward tongue block. A width of the first vertical part and a width of the first horizontal part may substantially equal a width of the second upward tongue. In addition, an offset between the first vertical part of the first hook and a remaining part of the second upward tongue to which it is connected by means of the first horizontal part, may substantially correspond to a width of the first upward tongue. The width of the first upward tongue, as measured in a direction along the second side of the floor panel, may correspond to the width of the lower upward tongue block as measured in this same direction.

A clearance between the lower upward tongue block and the second side of the intermediate part may substantially equal the clearance between the second upward tongue and the second side of the intermediate part. Additionally or alternatively, a clearance between the lower upward tongue block and the second upward tongue may substantially equal the clearance between the first upward tongue and the first side of the intermediate part.

The floor panel may further comprise an upper downward tongue block, which is aligned with and separated from the third downward tongue and aligned with and separated from the fourth downward tongue, and a second hook that protrudes from the fourth downward tongue and parallel to the fourth side, which second hook is configured for hooking into a clearance between the upper downward tongue block of a third further floor panel among said plurality of floor panels that is arranged adjacent to the first side of the floor panel, wherein, when the third further floor panel and the floor panel are coupled together, the fourth downward tongue of the floor panel, the fourth downward tongue of the third further floor panel, and the second hook can be received in a second upward groove of a fourth further floor panel for the purpose of simultaneously locking the floor panel, the third further floor panel, and the fourth further floor panel.

The floor panel may be configured such that, when the floor panel is coupled to said third further floor panel, the second hook, the fourth downward tongue of the third further floor panel, and the fourth downward tongue of the floor panel essentially form a continuous downward tongue.

The second hook may comprise a second horizontal part and a second vertical part protruding upward from the second horizontal part.

As an example of continuity of the downward tongue, a sum of a thickness of the second horizontal part and a height of the upper downward tongue block may substantially equal a height of the fourth downward tongue. Furthermore, a height of the second vertical part may substantially equal a height of the upper downward tongue block. A width of the second vertical part and a width the second horizontal part may be substantially equal to a width of the fourth downward tongue.

An offset between the second vertical part of the second hook and a remaining part of the fourth downward tongue to which it is connected by means of the second horizontal part may substantially correspond to a width of the third downward tongue.

A clearance between the upper downward tongue block and the fourth side of the intermediate part may substantially equal the clearance between the fourth downward tongue and the fourth side of the intermediate part. Additionally or alternatively, a clearance between the upper downward tongue block and the fourth downward tongue may substantially equal the clearance between the third downward tongue and the third side of the intermediate part.

The floor panel is preferably a laminated floor panel, wherein the lower part, the intermediate part, and the upper part form a core layer made from at least one of medium-density fiberboard (MDF) or a high-density fiberboard (HDF).

According to a further aspect, the present invention relates to a floor covering comprising a plurality of coupled floor panels as defined above. More in particular, the invention relates to a floor covering comprising the abovementioned floor panel, first further floor panel, second further floor panel, third further floor panel, and fourth further floor panel, wherein the third side of the floor panel is coupled to the first side of the first further floor panel, wherein the first side of the floor panel is coupled to the third side of the third further floor panel, wherein the fourth side of the second further floor panel is coupled to the second side of the floor panel and the second side of the first further floor panel, and wherein a second side of the fourth further floor panel is coupled to the fourth side of the floor panel and the fourth side of the third further floor panel.

BRIEF DESCRIPTION OF THE DRAWINGS

Next, the present invention will be described in more detail by referring to the appended drawings wherein identical reference signs will be used to indicate identical or similar components, and wherein.

DESCRIPTION OF THE INVENTION

Figure 1:
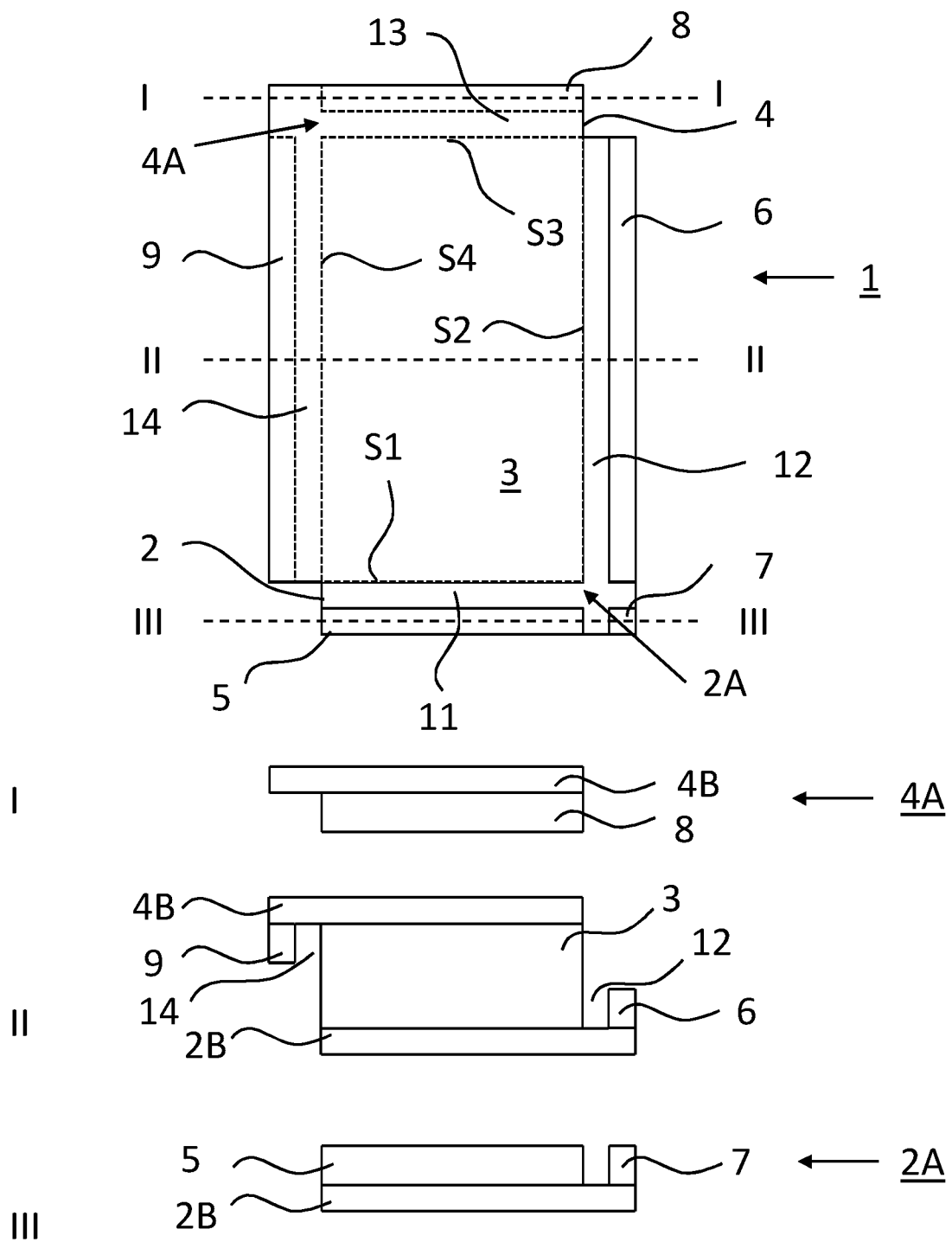
FIG. 1 illustrates a schematic top view of a known floor panel with corresponding cross-sectional views.

FIG. 1 illustrates a top view of an example of a known floor panel 1. It further illustrates cross-sectional views taken along dotted lines I, II, and III, which views are hereinafter referred to as view I, view II, and view III, respectively.

As shown in detail in view III, floor panel 1 comprises a lower part 2, an intermediate part 3, and an upper part 4. Lower part 2 comprises a lower extension region 2A that extends beyond intermediate part 3 at a first side S1 and at a second side S1 of intermediate part 3. Lower part 2 comprises an essentially flat base portion 2B from which a first upward tongue 5 and a second upward tongue 6 extend upwardly. First upward tongue 5 runs at a distance from and parallel to first side S1 and second upward tongue 6 runs at a distance from and parallel to second side S2. As shown in the top figure, a lower upward tongue block 7 extends upwardly from flat base portion 2B. This block is aligned with and separated from first upward tongue 5 and aligned with and separated from second upward tongue 6.

Upper part 4 comprises an upper extension region 4A that extends beyond intermediate part 3 at a third side S3 and at a fourth side S4 of intermediate part 3. Third side S3 and fourth side S4 are opposite to the first side S1 and second side S2, respectively.

Upper part 4 comprises an essentially flat base portion 4B from which a third downward tongue 8 and a fourth downward tongue 9 extend downwardly. Third downward tongue 8 runs at a distance from and parallel to third side S3 and fourth downward tongue 9 runs at a distance from and parallel to fourth side S4.

A clearance exists between first upward tongue 5 and intermediate part 3 which defines a first upward groove 11 for receiving third downward tongue 8 of an adjacent floor panel. Similarly, a clearance exists between second upward tongue 6 and intermediate part 3 which defines a second upward groove 12 for receiving fourth downward tongue 9 of an adjacent floor panel. A clearance also exists between third downward tongue 8 and intermediate part 3 which defines a third downward groove 13 for receiving first upward tongue 5 of an adjacent floor panel. In addition, a clearance exists between fourth downward tongue 9 and intermediate part 3 which defines a fourth downward groove 14 for receiving second upward tongue 6 of an adjacent floor panel.

A clearance exists between lower upward tongue block 7 and second upward tongue 6. This clearance typically corresponds to the clearance between first upper tongue 5 and intermediate part 3. Similarly, the clearance between lower upward tongue block 7 and first upward tongue 5 typically corresponds to the clearance between second upper tongue 6 and intermediate part 3.

Together, lower part 2, intermediate part 3, and upper part 4 form a core layer of the laminated floor panel. This core layer typically comprises a medium-density fiberboard (MDF) or a high-density fiberboard (HDF) layer. In an embodiment, a single core board is subjected to a series of cutting operations to thereby create extension regions 2A and 4A. Hence, although described as separate layers, the present invention does not exclude that these parts originate from an integral part.

Figure 2:
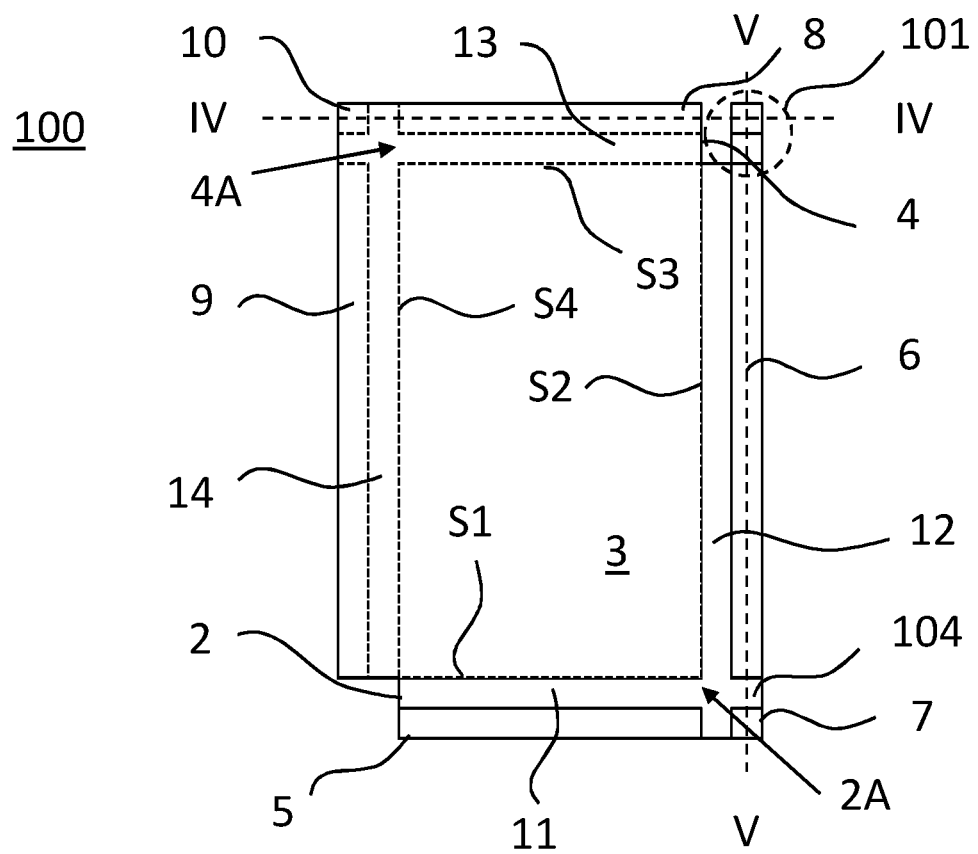
FIG. 2 illustrates a schematic top view of an embodiment of a floor panel in accordance with the invention with corresponding cross-sectional views.
Figure 2:
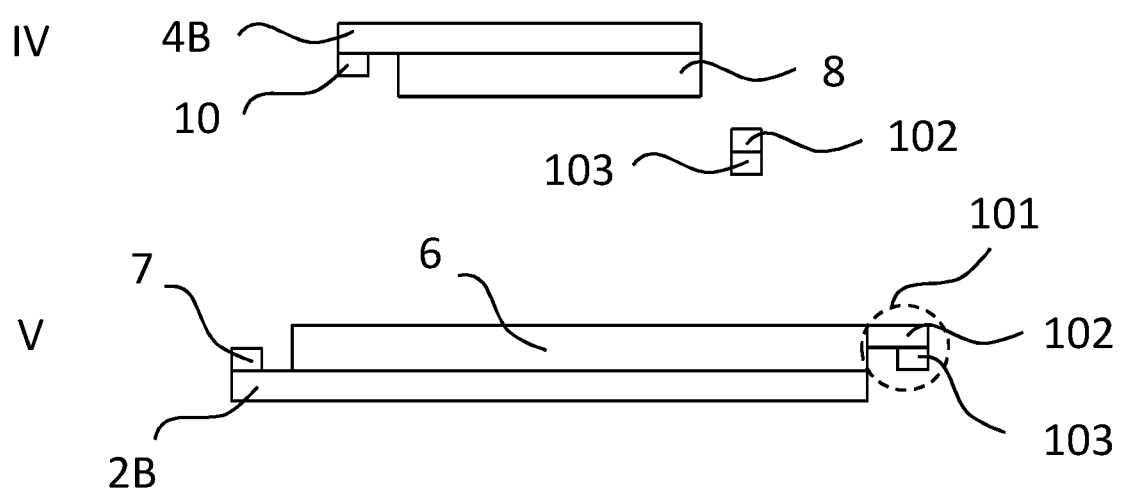

FIG. 2 illustrates a top view of an embodiment of a floor panel 100 in accordance with the invention. It further illustrates cross-sectional views taken along dotted lines IV and V, which views are hereinafter referred to as view IV, and view V, respectively.

This embodiment corresponds to the embodiment shown in FIG. 1 with the exception in that a first hook 101 is provided that protrudes from second upward tongue 6 and parallel to second side S2. First hook 101 is configured for hooking into a clearance 104 between lower upward tongue block 7 and second upward tongue 6 of a further floor panel that is arranged adjacent to third side S3 of floor panel 100.

When floor panel 100 and the further floor panel are coupled together, second upward tongue 6 of the floor panel, the second upward tongue of the further floor panel, and first hook 101 can be received in a fourth downward groove of an even further floor panel for the purpose of simultaneously locking the floor panel, the further floor panel, and the even further floor panel.

Views IV and V illustrate that first hook 101 comprises a first horizontal part 102 and a first vertical part 103 protruding downwardly from first horizontal part 102. A sum of a thickness of horizontal part 102 and a height of lower upward tongue block 7 may substantially equal a height of second upward tongue 6. Hence, when first hook 101 lies closely against lower upward tongue block 7, virtually no height difference exists between an upper surface of first hook 101 and an upper surface of second upward tongue 6.

Furthermore, a height of first vertical part 103 may substantially equal a height of lower upward tongue block 7. In this case, first vertical part 103 may touch base portion 2B.

A width of first vertical part 103 and a width of first horizontal part 102 may be substantially equal to a width of second upward tongue 6. These widths are measured in a direction parallel to the first side.

An offset between vertical part 103 of first hook 101 and a remaining part of second upward tongue 6 to which it is connected by means of horizontal part 102 may substantially correspond to a width of first upward tongue 5. This width may be measured in a direction parallel to second side S2. Moreover, the offset may correspond to a width of lower upward tongue block 7 when measured in the same direction.

Figure 3:
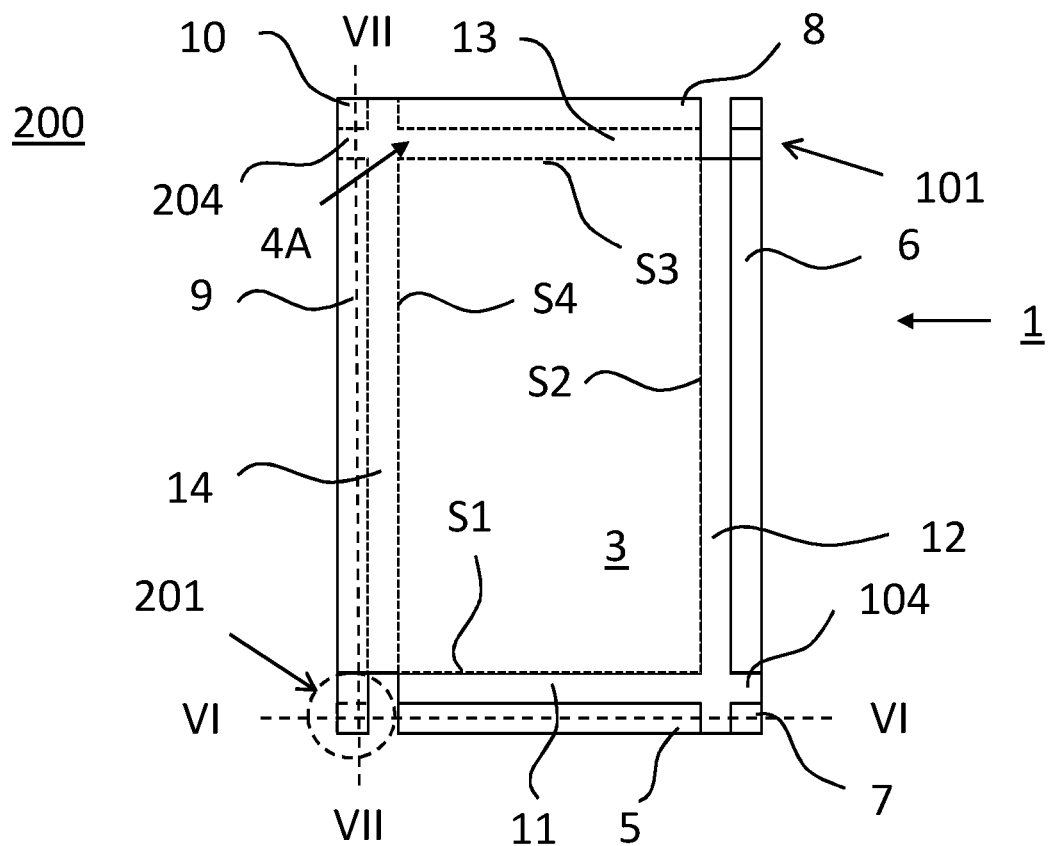
FIG. 3 illustrates a schematic top view of a further embodiment of a floor panel in accordance with the invention with corresponding cross-sectional views.
Figure 3:
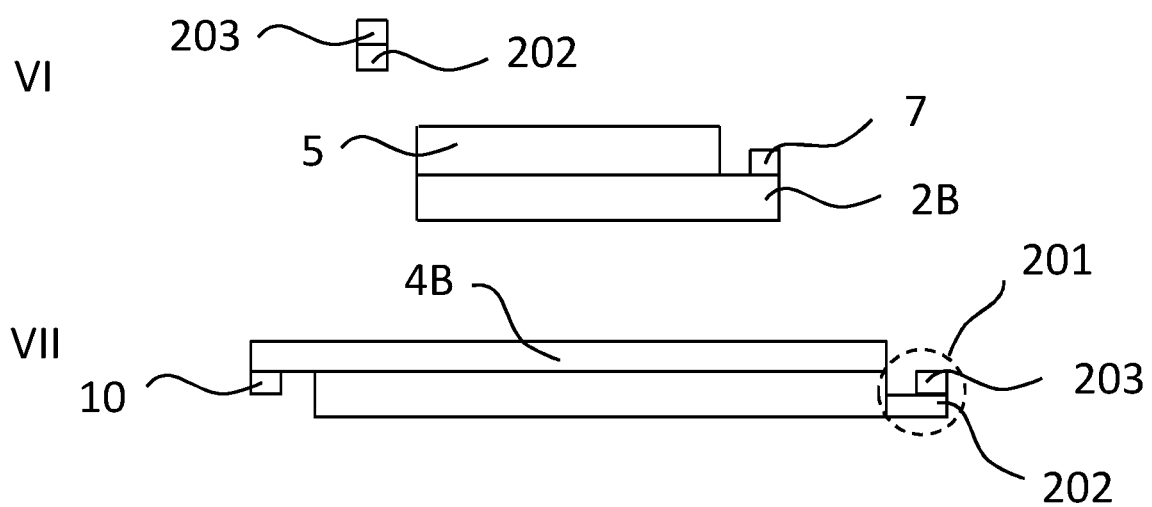

FIG. 3 illustrates a top view of a further embodiment of a floor panel 200 in accordance with the invention. It further illustrates cross-sectional views taken along dotted lines VI and VII, which views are hereinafter referred to as view VI, and view VII, respectively.

FIG. 3 illustrates that floor panel 200 comprises an upper downward tongue block 10 that extends downwardly from flat base portion 4B. Such block is aligned with and separated from third downward tongue 8 and aligned with and separated from fourth downward tongue 9.

The clearance between upper downward tongue block 10 and fourth downward tongue 9 typically corresponds to the clearance between third downward tongue 8 and intermediate part 3, and the clearance between upper downward tongue block 10 and third downward tongue 8 typically corresponds to the clearance between fourth downward tongue 9 and intermediate part 3.

Compared to the FIG. 2 embodiment, floor panel 200 further comprises a second hook 201 that protrudes from fourth downward tongue 9 and parallel to fourth side S4. Second hook 201 is configured for hooking into a clearance 204 between upper downward tongue block 10 and fourth downward tongue 9 of a further floor panel that is arranged adjacent to first side S1 of floor panel 200.

When floor panel 200 and the further floor panel are coupled together, fourth downward tongue 9 of floor panel 200, the fourth downward tongue of the further floor panel, and second hook 201 can be received in a second upward groove of an even further floor panel for the purpose of simultaneously locking floor panel 200, the further floor panel, and the even further floor panel.

Views VI and VII illustrate that second hook 201 comprises a first horizontal part 202 and a first vertical part 203 protruding upward from first horizontal part 202. A sum of a thickness of horizontal part 202 and a height of upper downward tongue block 10 may substantially equal a height of fourth downward tongue 9. Hence, when second hook 201 lies closely against upper downward tongue block 10, virtually no height difference exists between a lower surface of second hook 201 and a lower surface of fourth downward tongue 9.

Furthermore, a height of first vertical part 203 may substantially equal a height of upper downward tongue block 10. In this case, first vertical part 203 may touch base portion 4B.

A width of first vertical part 203 and a width of first horizontal part 202 may be substantially equal to a width of fourth downward tongue 9.

An offset between vertical part 203 of second hook 201 and a remaining part of fourth downward tongue 9 to which it is connected by means of horizontal part 202 may substantially correspond to a width of third downward tongue 8. This width may correspond to the width of upper downward tongue block 10 in the direction parallel to fourth side S4.

Although FIGS. 1, 2, and 3 illustrate various structures, such as tongues, hooks, and grooves that have right angles, the present invention does not exclude that other, more irregular structures are used. For example, tongues 5, 6, 8, 9, grooves 11, 12, 13, 14 and block 7 can be embodied as described in EP 2440724.

Figure 4:
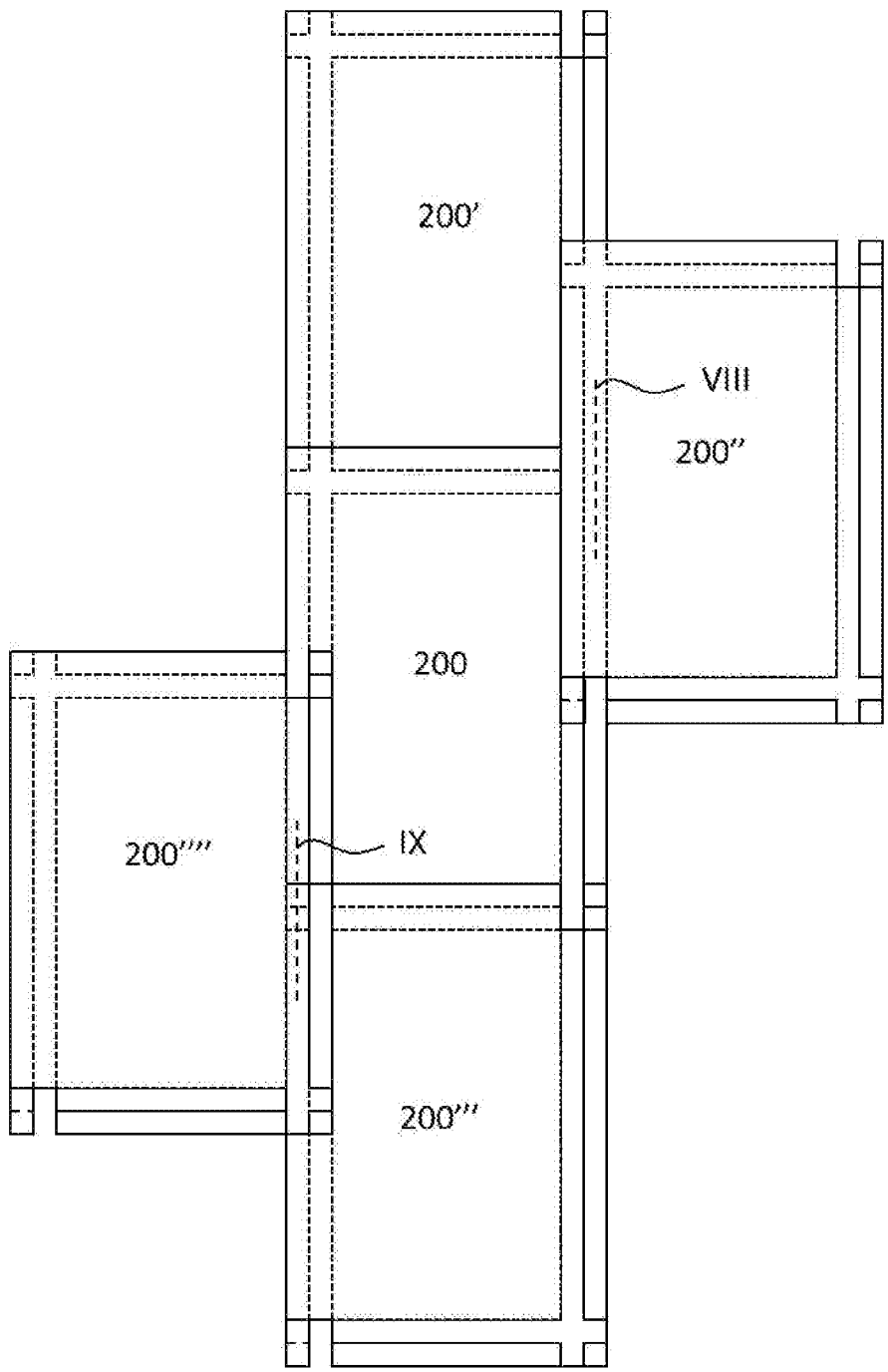
FIG. 4 illustrates a partial floor covering constructed using the floor panels from FIG. 3.
Figure 5A:
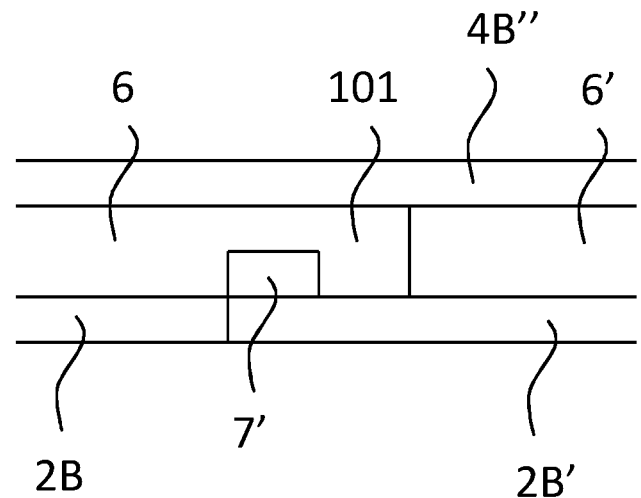
FIGS. 5A and 5B illustrate two cross-sectional views corresponding to the floor covering of FIG. 4.
Figure 5B:
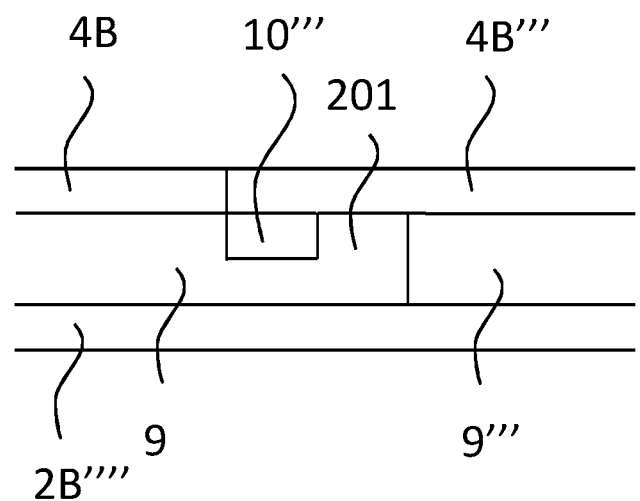

FIG. 4 illustrates a floor covering comprising a plurality of coupled floor panels 200, 200', 200", 200''', 20'''' as illustrated in FIG. 3. FIGS. 5A and 5B illustrate corresponding cross-sectional views taken along lines VIII and IX in FIG. 4, respectively.

FIG. 5A illustrates how a floor panel 200 is coupled using a first hook 101 to an adjacent floor panel 200', thereby forming an essentially continuous upward tongue 6, 6'. This continuous upward tongue 6, 6' lies against base portion 4B" of floor panel 200".

FIG. 5B illustrates how floor panel 200 is coupled using a second hook 201 to an adjacent floor panel 200''', thereby forming an essentially continuous downward tongue 9, 9'''. This continuous downward tongue 9, 9' lies against base portion 2B'''' of floor panel 200''''.

In the floor panels shown in FIGS. 2-5, the first upward groove and the second upward groove are at a substantially identical vertical level. This level is defined by the upper flat surface of base portion 2B. Similarly, the third downward groove and the fourth downward groove are at a substantially identical vertical level. This level is defined by the lower flat surface of base portion 4B.

In the above, the invention has been described using detailed embodiments thereof. However, the skilled person will appreciate that the invention is not limited to these embodiments and that various modifications are possible without deviating from the scope of the invention which is defined in the appended claims.

LIST OF REFERENCE SIGNS

1. Floor panel
2. Lower part
2A. Lower extension region
2B. Flat base portion lower part
3. Intermediate part
4. Upper part
4A. Upper extension region
4B. Flat base portion upper part
5. First upward tongue
6. Second upward tongue
7. Lower upward tongue block
8. Third downward tongue
9. Fourth downward tongue
10. Upper downward tongue
11. First upward groove
12. Second upward groove
13. Third downward groove
14. Fourth downward groove
100. Floor panel
101. First hook
102. Horizontal part first hook
103. Vertical part first hook
104. Clearance
204. Clearance
201. Second hook
202. Horizontal part second hook
203. Vertical part second hook
200. Floor panel
200'. First further floor panel
200". Second further floor panel
200'''. Third further floor panel
200''''. Fourth further floor panel
S1. First side
S2. Second side
S3. Third side
S4. Fourth side

The invention claimed is:
1. A floor panel configured to be used for constructing a floor covering that comprises a plurality of said floor panels, the floor panel comprising:
a lower part, an intermediate part, and an upper part, wherein the lower part has a lower extension region that extends beyond the intermediate part at a first and second side of the intermediate part, and wherein the upper part has an upper extension region that extends beyond the intermediate part at a third and fourth side of the intermediate part, wherein the third and fourth sides are opposite to the first and second sides, respectively;
wherein the lower extension region comprises:
a first upward tongue that runs at a distance from and parallel to the first side of the intermediate part;
a second upward tongue that runs at a distance from and parallel to the second side of the intermediate part;
a lower upward tongue block, the lower upward tongue block being aligned with and separated from the first upward tongue and aligned with and separated from the second upward tongue;
wherein the upper extension region comprises:
a third downward tongue that runs at a distance from and parallel to the third side of the intermediate part;
a fourth downward tongue that runs at a distance from and parallel to the fourth side of the intermediate part;
wherein a first clearance between the first upward tongue and the intermediate part defines a first upward groove for receiving the third downward tongue of an adjacent floor panel;
wherein a second clearance between the second upward tongue and the intermediate part defines a second upward groove for receiving the fourth downward tongue of an adjacent floor panel;
wherein a third clearance between the third downward tongue and the intermediate part defines a third downward groove for receiving the first upward tongue of an adjacent floor panel;

wherein a fourth clearance between the fourth downward tongue and the intermediate part defines a fourth downward groove for receiving the second upward tongue of an adjacent floor panel;

wherein the floor panel further comprises a first hook that protrudes from the second upward tongue and parallel to the second side, the first hook being configured for hooking into a fifth clearance between the lower upward tongue block and the second upward tongue of a first further floor panel among said plurality of floor panels that is arranged adjacent to the third side of the floor panel, wherein, the first further floor panel and the floor panel are configured to be coupled together in which the second upward tongue of the floor panel, the second upward tongue of the first further floor panel, and the first hook are configured to be received in a fourth downward groove of a second further floor panel among said plurality of floor panels for a purpose of simultaneously locking the floor panel, the first further floor panel, and the second further floor panel, the second further floor panel being arranged adjacent to the second side of the floor panel.

2. The floor panel according to claim 1, wherein the first upward groove and the second upward groove are at a substantially identical vertical level.

3. The floor panel according to claim 1, wherein third downward groove and the fourth downward groove are at a substantially identical vertical level.

4. The floor panel according to claim 1, wherein the first hook comprises a first horizontal part and a first vertical part protruding downward from the first horizontal part.

5. The floor panel according to claim 4, wherein the floor panel is configured such that the floor panel is configured to be coupled to said first further floor panel, in which the first hook, the second upward tongue of the first further floor panel, and the second upward tongue of the floor panel form a continuous upward tongue.

6. The floor panel according to claim 4, wherein a sum of a thickness of the first horizontal part and a height of the lower upward tongue block substantially equals a height of the second upward tongue.

7. The floor panel according to claim 4, wherein a height of the first vertical part substantially equals a height of the lower upward tongue block.

8. The floor panel according to claim 4, wherein a width of the first vertical part and a width of the first horizontal part is substantially equal to a width of the second upward tongue.

9. The floor panel according to claim 4, wherein an offset between the first vertical part of the first hook and a remaining part of the second upward tongue to which the first vertical part of the first hook is connected by the first horizontal part, substantially corresponds to a width of the first upward tongue.

10. The floor panel according to claim 1, wherein at least one of: a sixth clearance between the lower upward tongue block and the second side of the intermediate part substantially equals the second clearance between the second upward tongue and the second side of the intermediate part; and wherein a seventh clearance between the lower upward tongue block and the second upward tongue substantially equals the first clearance between the first upward tongue and the first side of the intermediate part.

11. The floor panel according to claim 1, further comprising:

an upper downward tongue block, which is aligned with and separated from the third downward tongue and aligned with and separated from the fourth downward tongue;

a second hook that protrudes from the fourth downward tongue and parallel to the fourth side, which second hook is configured for hooking into a clearance between the upper downward tongue block and the fourth downward tongue of a third further floor panel among said plurality of floor panels that is arranged adjacent to the first side of the floor panel, wherein, the third further floor panel and the floor panel are configured to be coupled together, in which the fourth downward tongue of the floor panel, the fourth downward tongue of the third further floor panel, and the second hook are configured to be received in a second upward groove of a fourth further floor panel among said plurality of floor panels for a purpose of simultaneously locking the floor panel, the third further floor panel, and the fourth further floor panel, the fourth further floor panel being arranged adjacent to the fourth side of the floor panel.

12. The floor panel according to claim 11, wherein the second hook comprises a second horizontal part and a second vertical part protruding upward from the second horizontal part.

13. The floor panel according to claim 12, wherein the floor panel is configured such that, the floor panel is configured to be coupled to said third further floor panel, in which the second hook, the fourth downward tongue of the third further floor panel, and the fourth downward tongue of the floor panel form a continuous downward tongue.

14. The floor panel according to claim 12, wherein a sum of a thickness of the second horizontal part and a height of the upper downward tongue block substantially equals a height of the fourth downward tongue.

15. The floor panel according to claim 12, wherein a height of the second vertical part substantially equals a height of the upper downward tongue block.

16. The floor panel according to claim 12, wherein a width of the second vertical part and a width of the second horizontal part are substantially equal to a width of the fourth downward tongue.

17. The floor panel according to claim 12, wherein an offset between the vertical part of the second hook and a remaining part of the fourth downward tongue to which it is connected by the second horizontal part substantially corresponds to a width of the third downward tongue.

18. The floor panel according to claim 12, wherein at least one of:

a clearance between the upper downward tongue block and the fourth side of the intermediate part substantially equals the clearance between the fourth downward tongue and the fourth side of the intermediate part; and wherein a clearance between the upper downward tongue block and the fourth downward tongue substantially equals the clearance between the third downward tongue and the third side of the intermediate part.

19. The floor panel according to claim 1, wherein the floor panel is a laminated floor panel, wherein the lower part, the intermediate part, and the upper part form a core layer made from at least one of medium-density fiberboard (MDF) or a high-density fiberboard (HDF).

20. A floor covering comprising a plurality of coupled floor panels as defined in claim 1.

* * * * *

UNITED STATES PATENT AND TRADEMARK OFFICE
CERTIFICATE OF CORRECTION

PATENT NO. : 11,761,215 B2
APPLICATION NO. : 17/426982
DATED : September 19, 2023
INVENTOR(S) : Antonio Giuseppe Perra It is certified that error appears in the above-identified patent and that said Letters Patent is hereby corrected as shown below:

On the Title Page

Column 1, Item (71) Applicant, Line 1, delete "14F" and insert -- I4F --

Column 1, Item (73) Assignee, Line 1, delete "14F" and insert -- I4F --

Signed and Sealed this
Seventh Day of November, 2023

Katherine Kelly Vidal
*Director of the United States Patent and Trademark Office*